(No Model.)  3 Sheets—Sheet 2.

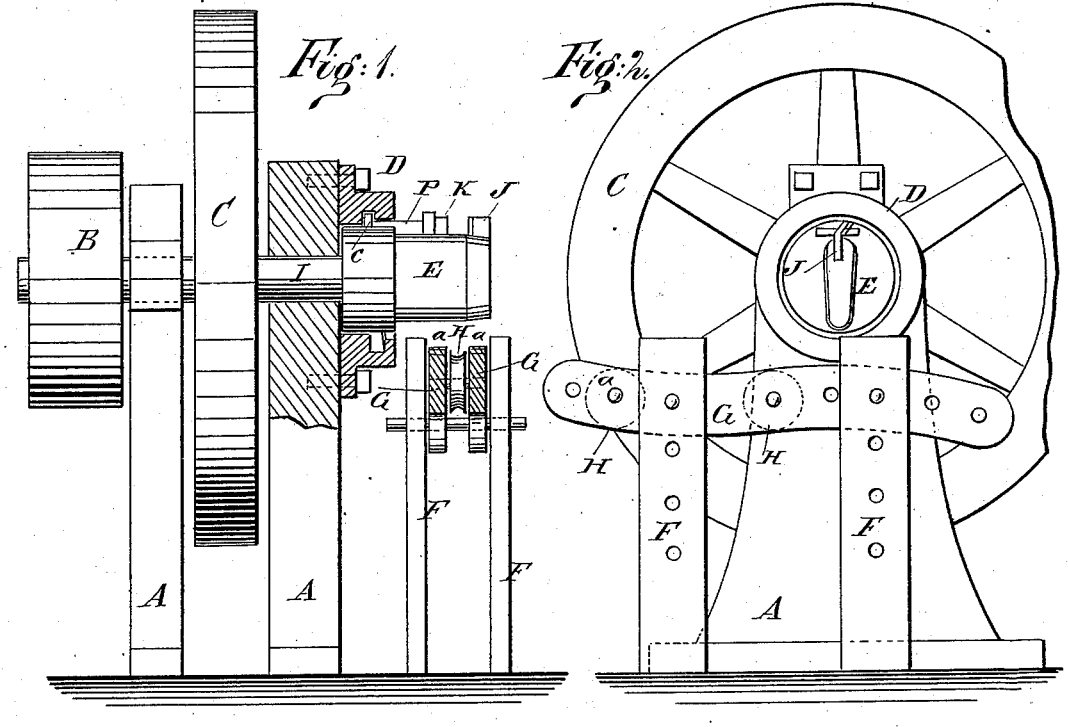
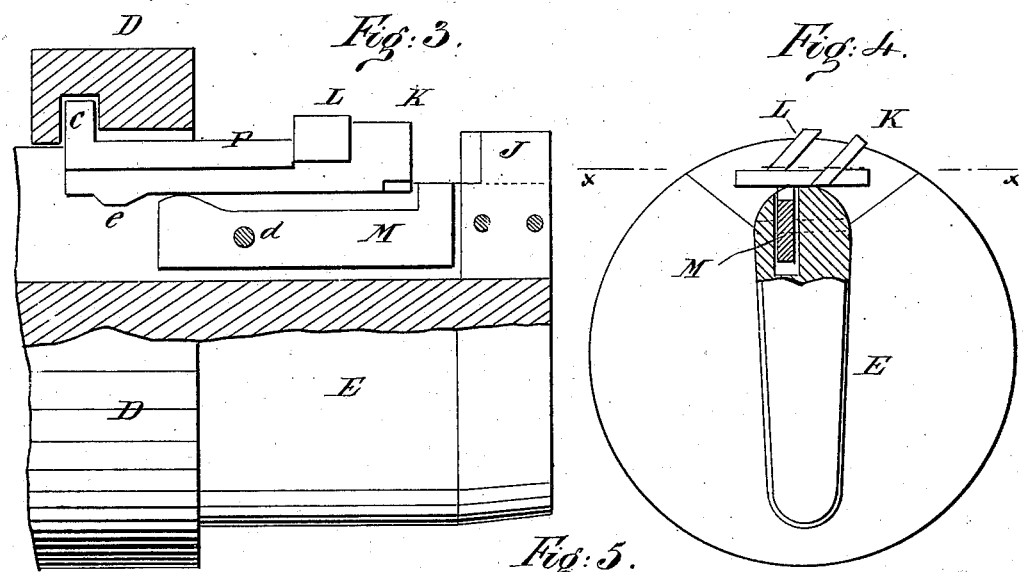
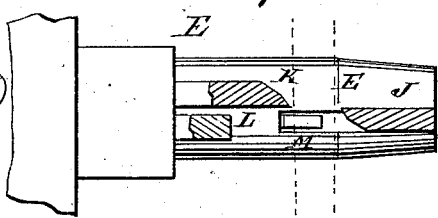

H. A. IDDINGS.
MACHINE FOR FORMING AND CUTTING LINKS.

No. 290,773. Patented Dec. 25, 1883.

WITNESSES:
Chas. Nida.
C. Sedgwick

INVENTOR:
H. A. Iddings
BY Munn & Co.
ATTORNEYS.

(No Model.)  3 Sheets—Sheet 3.
H. A. IDDINGS.
MACHINE FOR FORMING AND CUTTING LINKS.
No. 290,773. Patented Dec. 25, 1883.
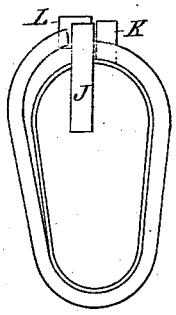
Fig. 10.
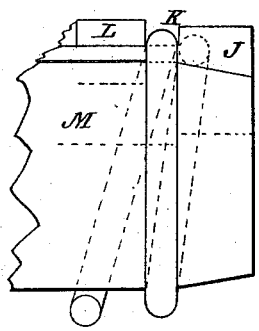
Fig. 11.
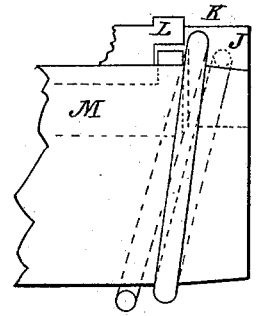
Fig. 12.
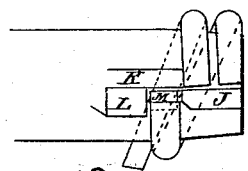
Fig. 15.
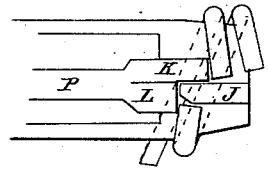
Fig. 16.
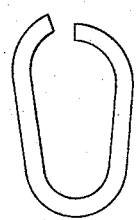
Fig. 13.
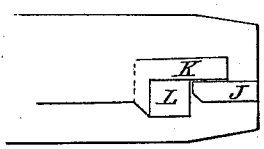
Fig. 17.
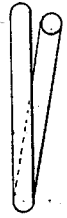
Fig. 14.
Fig. 18.
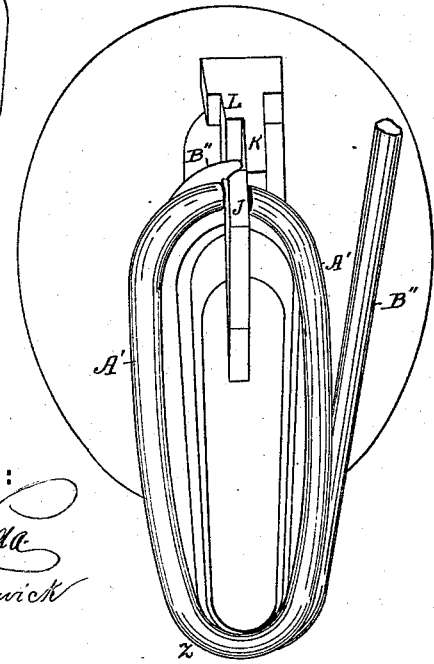
WITNESSES:
Chas. Nida
C. Sedgwick
INVENTOR:
H. A. Iddings
BY Munn & Co
ATTORNEYS.

UNITED STATES PATENT OFFICE.

HENRY ALFRED IDDINGS, OF WARREN, OHIO.

MACHINE FOR FORMING AND CUTTING LINKS.

SPECIFICATION forming part of Letters Patent No. 290,773, dated December 25, 1883.

Application filed October 31, 1882. (No model.)

*To all whom it may concern:*

Be it known that I, HENRY A. IDDINGS, of Warren, in the county of Trumbull and State of Ohio, have invented a new and useful Improvement in Machines for Forming and Cutting Links, of which the following is a full, clear, and exact description.

My improvements relate to machines for forming and cutting link-blanks, the object being to construct a machine for bending and cutting links at one operation, instead of using separate machines, one for forming and the other for cutting the links.

The invention consists in certain novel features of construction and combinations of parts, as hereinafter described and claimed.

Reference is to be had to the accompanying drawings, forming a part of this specification, in which similar letters of reference indicate corresponding parts in all the figures.

Figure 8:
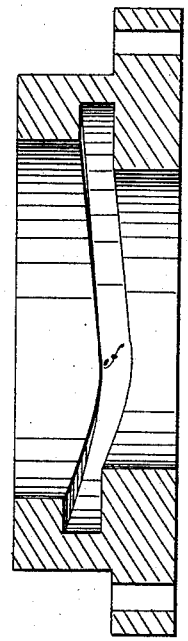
Figure 6:
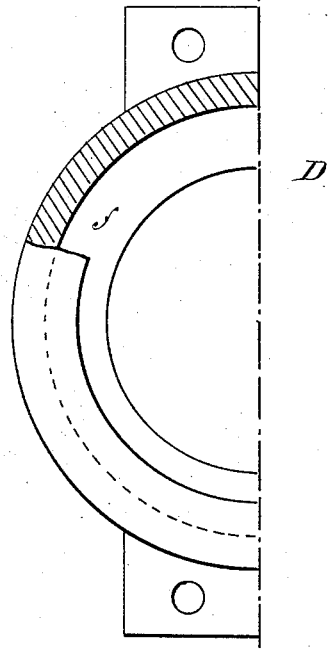
Figure 7:
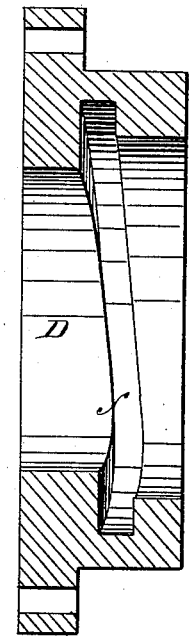
Figure 9:
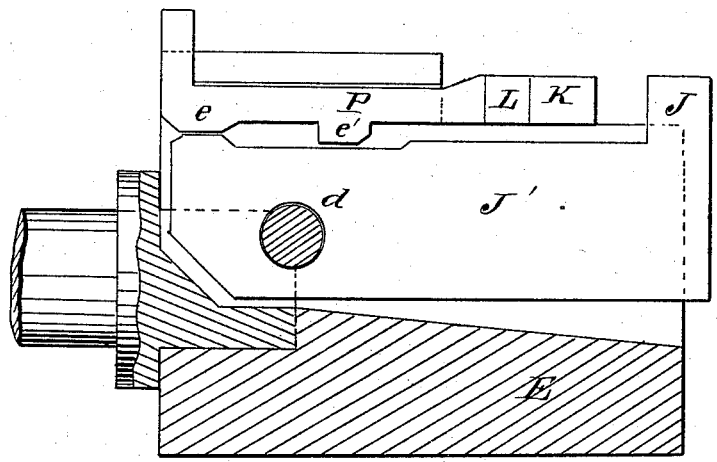

Figure 1 is a side elevation of the machine, partially sectional. Fig. 2 is an end view of the machine. Fig. 3 is a longitudinal section, and Fig. 4 is a cross-section, of the mandrel and cutters in larger size. Fig. 5 is a sectional plan view of the mandrel on the line $x$ $x$, Fig. 4. Figs. 6, 7, and 8 represent the cam for operating the cutters. Fig. 9 is a longitudinal section of a mandrel with cutters of slightly-modified construction. Fig. 10 is an end view of the mandrel with a link just ready to be thrown off. Fig. 11 is a side view of the mandrel after the link has been cut and the lever has raised one end. Fig. 12 is a side view, showing the link in the act of being pushed forward by the dog. Fig. 13 is a front view of the link as it is being thrown off the mandrel. Fig. 14 is an edge view of the same in elevation. Fig. 15 is a top view of Fig. 11, and Fig. 16 a top view of Fig. 12. Fig. 17 is a plan view, showing the relative position of the dog and knives just after the link has been pushed past the stationary knife. Fig. 18 is an end elevation, showing the position of the link and rod-blank after the knives have passed each other.

A is the frame of the machine.

B is the driving-pulley, and C a balance-wheel on the shaft I, that is supported in the frame.

D is a cam-ring firmly bolted to the frame A.

E is the mandrel, secured to one end of the shaft; and F is a fixed frame, between the sides of which is a movable frame, G, that consists of two bars, $a\ a$, that carry the tension-sheaves H H. The frame F and the bars $a\ a$ are made with a series of bolt-holes, as shown in Fig. 2, so that the inner frame, G, carrying the sheaves, may be moved backward and forward, and upward and downward, as occasion may require, to give more or less tension. There may be one, two, or more of the sheaves H, as the metal may require, and their faces are shaped to correspond with the surface of the metal rod that is to be acted upon.

On the outer end of the mandrel E is a knife or shear, J, the lower edge of which is mortised into the mandrel and fastened by means of bolts, as shown in Fig. 3. The edge which extends above the mandrel is erect or bent to one side, as shown, according as to whether the material is to be cut with a beveled or a straight edge.

K is the cutter fastened to or made a part of a slide-bar, P, that is also formed or provided with a lug portion or dog, L. It is formed at its rear end with a lug or projection, $c$, that enters a groove formed upon the interior surface of the cam-ring D.

M is a lever pivoted in a groove in the mandrel on a cross-pin, $d$, and formed with a projection at its forward end, projecting upward through the surface of the mandrel at the rear of the knife J.

$e$ is a projection upon the under side of the bar P, placed in position for acting upon the rear end of the lever M when the slide is moved forward by the cam.

The mandrel E is preferably of the oval shape shown, although I do not limit myself in that respect, as the portion back of the forward edge of knife $k$ can be made in any desired form up to that of a full circle, for the purpose of giving additional strength.

The construction of the cam-ring D is shown most clearly in Figs. 6, 7, and 8, it being formed with a groove, $f$, which is shaped to give the required backward-and-forward movement to the slide-bar P, carrying the knife K and dog L. The frame G, carrying the sheaves, may be of a curved form, as shown, or it may be made straight. The knife J can be made with a chamfered edge, as shown in Fig. 5, or with a straight edge.

In the operation of the machine, the metal for forming the links, having been previously rolled in long bars, is fed to or placed upon the mandrel E in the opening between the two knives J K. As the mandrel turns, the rear knife, K, is moved forward by the action of the cam, and being forced against the bar, the cutting immediately commences, and the end of the bar being thus held as the mandrel revolves, and, forced against the mandrel by the tension-sheaves H, the bar is caused to assume the shape of the mandrel, the cutting continuing until the mandrel has made more than a half-revolution, at which time the lever M is moved by the lug $e$, and its forward end acts to raise the cut end of the rod just far enough to allow the dog L to push the link forward on the knife J. The slide P, with the dog L and knife K, then return, by a quick movement, and the parts are again in position to act upon the rod for the formation of a new link. In this manner the link-blank can be rapidly made and cut at the same time, and the cutting being done slowly, less power is required than when the cut is made by a quick operation. It will be seen that I thus save both power, labor, and machinery.

In Fig. 9 the knife or cutter J is formed at the end of a lever, J', working on a pin, $d$, and fitted in a groove of the mandrel E, thus dispensing with the lever M before mentioned. The slide P, carrying the dog L and cutter K, is provided at its under side with two lugs, $e\ e'$, which act to give a downward movement to the lever J' after the cutting is completed, and also to return the cutter J to its raised position when the slide P moves back. The mandrel is tapered at its extreme end to facilitate discharge of the blank. The size of the cam-wheel, mandrel, and knives will vary with the size of the bar or rod of which the links are formed. The position of the link after the dog L has pushed it forward on the knife J is not always the same, as it will sometimes fall entirely off the mandrel, and at others will hang on the mandrel until the winding of the next link forces it off. The length of the link is gaged by the size of the mandrel. Each revolution of the mandrel produces one link, which is kept tightly to the mandrel by the sheaves H. The rod, after passing over and under the sheaves H, has one end placed between the knives, and the revolution of the mandrel draws the metal forward through the sheaves, the knife K cutting until after the mandrel has turned more than half-way over. As soon as the knives have completed the cutting, the point of the link, which is between the knives, rises just enough to allow the cut end to pass the bevel of the knife J, and the dog L moves forward far enough to press the cut end to the right of the extreme left side of knife J, as shown in Fig. 12 of drawings. Then, by the movement of the cam, the knife K and dog L are drawn back, leaving an open space between the knives for the metal, which is again brought between them by the revolution of the mandrel. If the last-cut link remains upon the mandrel, the new link crowds it forward and off the mandrel. In Fig. 17 the knife J drops after the cutting is finished, and this allows the dog L to push the cut end forward. Then, by the backward movement of the slide P, the knife J is raised, and thus opens the ends of the link, so as to pass between them.

In machines for making large-sized blanks, the shaft I would be driven by gear-wheels, instead of a pulley and belt. In that case, shaft I would be provided with a gear, engaging a gear-wheel on a second or driving shaft fitted on the frame, and this second shaft would carry the balance-wheel. The first cut from the end of the bar will take off a short piece, and there will also be another piece left after the last link. This last will depend upon the size of the link-bar employed and the distance between the sheaves.

In Fig. 18 of the drawings, A' represents the link just after the points of the two knives J K have passed each other and the complete link is formed and cut. B' B'' B''' represent the partly-formed link, the dog L being just ready to crowd the part or end B'' forward to the side of the knife J now occupied by the end of the completed link A'. The latter is thereby forced off the end of the mandrel, to leave room upon the mandrel, between the knives, for the end B''' as the mandrel revolves. The shape of the mandrel and the bend Z of the link serve to hold the unfinished link on the mandrel.

Having thus described my invention, I claim as new and desire to secure by Letters Patent—

1. The combination, in a link forming and cutting machine, of the frame F and bars $a\ a$, each having a corresponding series of holes to receive a bolt, whereby the sheaves may be adjusted to regulate the tension, as described.

2. The combination of lever J', fixed cutter J, and moving cutter K with the mandrel E, substantially as shown and described.

3. The combination, with the revolving mandrel E, of the fixed cutter J and the slide P, carrying the cutter K, substantially as described, for operation as set forth.

4. The combination, with the mandrel E, of the fixed cutter J and the slide P, provided with the cutter K and dog L, substantially as shown and described.

5. The combination of the mandrel E, the fixed cutter J, the slide P, the cutter K, and grooved cam-ring D, substantially as described, for operation as set forth.

6. The combination, in a link forming and cutting machine, with bars *a a* and frame F, of the sheave H and shears J K, to hold the blank bar to the mandrel, as described.

7. In a link forming and cutting machine, a slide, P, carrying a dog, L, and lug *e*, and a lever, M, having a vertical projection on the upper part of its front end, in combination, by which to first raise and then push the link-bar end beyond the edge of knife J, as and for the purpose specified.

HENRY ALFRED IDDINGS.

Witnesses:
F. E. CALDWELL,
J. L. HERZOG.